(12) United States Patent
Phillips et al.

(10) Patent No.: US 12,093,321 B2
(45) Date of Patent: Sep. 17, 2024

(54) METHODS AND SYSTEMS FOR SIMILARITY SEARCHING ENCRYPTED DATA STRINGS

(71) Applicant: Capital One Services, LLC, McLean, VA (US)

(72) Inventors: Carolyn Phillips, Chicago, IL (US); Venkataseshagiri Chintala, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 545 days.

(21) Appl. No.: 17/481,393

(22) Filed: Sep. 22, 2021

(65) Prior Publication Data

US 2023/0086508 A1 Mar. 23, 2023

(51) Int. Cl.
*G06F 16/903* (2019.01)
*G06F 16/93* (2019.01)
*G06F 21/60* (2013.01)
*G06F 21/62* (2013.01)

(52) U.S. Cl.
CPC ........ *G06F 16/90344* (2019.01); *G06F 16/93* (2019.01); *G06F 21/602* (2013.01); *G06F 21/6245* (2013.01)

(58) Field of Classification Search
CPC ............. G06F 21/6227; G06F 21/6245; G06F 21/2654; G06F 16/93; G06F 16/90344; G06F 16/3341; G06F 16/3347
See application file for complete search history.

(56) References Cited

U.S. PATENT DOCUMENTS

| | | | |
|---|---|---|---|
| 9,652,512 B2 | 5/2017 | Litherland et al. | |
| 10,489,604 B2 | 11/2019 | Toshino et al. | |
| 10,528,557 B1* | 1/2020 | Chmil | H04L 9/0894 |
| 10,673,627 B2 | 6/2020 | Kawai et al. | |
| 11,893,128 B2* | 2/2024 | Liu | G06F 21/602 |
| 2014/0052999 A1* | 2/2014 | Aissi | G06F 21/64 |
| | | | 713/189 |
| 2020/0125563 A1 | 4/2020 | Fan et al. | |

OTHER PUBLICATIONS

Wang et al., Generalized Pattern Matching String Search on Encrypted Data on Cloud Systems, 2015 INFOCOM (Year: 2015).*

* cited by examiner

*Primary Examiner* — Paul E Callahan
(74) *Attorney, Agent, or Firm* — Bookoff McAndrews, PLLC

(57) ABSTRACT

Methods and systems of similarity searching encrypted data strings are disclosed. An exemplary method can include receiving data strings, obtaining a set of reference strings, determining edit distances between each data string and the reference strings, converting each set of edit distances into a document of tokens. A method may further include encrypting the data strings, associating each of the documents with a corresponding data string, and storing the data strings and the associated documents in a memory. A method may continue by receiving a search request, determining a search set of edit distances between the search request and the reference strings, converting the search set of edit distances into a document, comparing the search document with the documents stored in memory to determine which documents are above a similarity threshold compared to the search document, and returning the data strings associated with documents above the similarity threshold.

20 Claims, 5 Drawing Sheets

METHODS AND SYSTEMS FOR SIMILARITY SEARCHING ENCRYPTED DATA STRINGS

TECHNICAL FIELD

Various embodiments of the present disclosure relate generally to methods and systems for conducting searches in encrypted data and, more particularly, to methods and systems for similarity searching encrypted data strings to identify data strings that are similar to a search string without decrypting a dataset.

BACKGROUND

As data security becomes increasingly critical to the operation of many businesses and systems, a database may contain some fields which, for security reasons, need to be encrypted at rest. For example, social security numbers (SSNs) of customers as well as other forms of sensitive customer information may need to be stored in a database, but this type of sensitive information should be encrypted and secured as much of the time as is practical. However, it is still desirable to rapidly query and find records where the encrypted field is similar to a provided field without decrypting all the fields. Situations such as those where it is suspected that a record was accidentally or improperly inserted into the database with a typo in a data field that was then encrypted often require traditional databases to decrypt large amounts of data, thereby increasing the risk of the data being compromised.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for similarity searching encrypted data strings. Each of the examples disclosed herein may include one or more of the features described in connection with any of the other disclosed examples.

In one aspect, an exemplary embodiment of a method for similarity searching encrypted data strings may include receiving a plurality of data strings to be encrypted and obtaining a set of reference strings. An exemplary method may proceed by determining a respective set of edit distances between each data string of the plurality of data strings and the set of reference strings, converting each respective set of edit distances into a document of tokens. An exemplary method may further include encrypting the plurality of data strings, associating each of the documents of tokens with a corresponding encrypted data string of the plurality of encrypted data strings, and storing the plurality of encrypted data strings and the associated plurality of documents of tokens in a memory. An exemplary method may continue by receiving a search request to search the plurality of encrypted data strings, determining a search set of edit distances between the search request and the set of reference strings, converting the search set of edit distances into a search document of tokens, comparing the search document of tokens with the plurality of documents of tokens stored in the memory to determine which of the plurality of documents of tokens are above a predetermined similarity threshold when compared to the search document of tokens, and returning, as a search result, the data strings that are associated with the documents of tokens of the plurality of documents of tokens that are above the predetermined similarity threshold when compared to the search document of tokens.

In another aspect, an exemplary embodiment of a system for conducting searches within encrypted data strings may include a memory storing instructions and a processor executing the instructions to perform a process. The process may include receiving a plurality of data strings to be encrypted and obtaining a set of reference strings. The process may proceed by determining a respective set of edit distances between each data string of the plurality of data strings and the set of reference strings, converting each respective set of edit distances into a document of tokens. The process may further include encrypting the plurality of data strings, associating each of the documents of tokens with a corresponding encrypted data string of the plurality of encrypted data strings, and storing the plurality of encrypted data strings and the associated plurality of documents of tokens in a memory. The process may continue by receiving a search request to search the plurality of encrypted data strings, determining a search set of edit distances between the search request and the set of reference strings, converting the search set of edit distances into a search document of tokens, comparing the search document of tokens with the plurality of documents of tokens stored in the memory to determine which of the plurality of documents of tokens are above a predetermined similarity threshold when compared to the search document of tokens, and returning, as a search result, the plurality of data strings that are associated with the documents of tokens of the plurality of documents of tokens that are above the predetermined similarity threshold when compared to the search document of tokens.

An exemplary embodiment of a method for similarity searching encrypted data strings may include receiving a plurality of data strings comprising personally identifying information to be encrypted for storage, and obtaining a set of reference strings having dimensions that match dimensions of the plurality of data strings. An exemplary method may proceed by determining a respective set of edit distances between each data string of the plurality of data strings and the set of reference strings, and converting each respective set of edit distances into a document of tokens. An exemplary method may further include encrypting the plurality of data strings, associating each of the documents of tokens with a corresponding encrypted data string of the plurality of encrypted data strings, and storing the plurality of encrypted data strings and the associated plurality of documents of tokens in an encrypted database. An exemplary method may continue by receiving a search request to search the plurality of encrypted data strings, the search request comprising a search data string and a similarity threshold, determining a search set of edit distances between the search request data string and the set of reference strings, converting the search set of edit distances into a search document of tokens, and comparing the search document of tokens with the plurality of documents of tokens stored in the encrypted database to determine which of the plurality of documents of tokens are above the similarity threshold when compared to the search document of tokens. An exemplary method can then conclude by decrypting the encrypted data strings that are associated with the documents of tokens of the plurality of documents of tokens that are above the similarity threshold when compared to the search document of tokens, and returning, as a search result, the decrypted data strings that are associated with the documents of tokens of the plurality of documents of tokens that are above the similarity threshold when compared to the search document of tokens.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
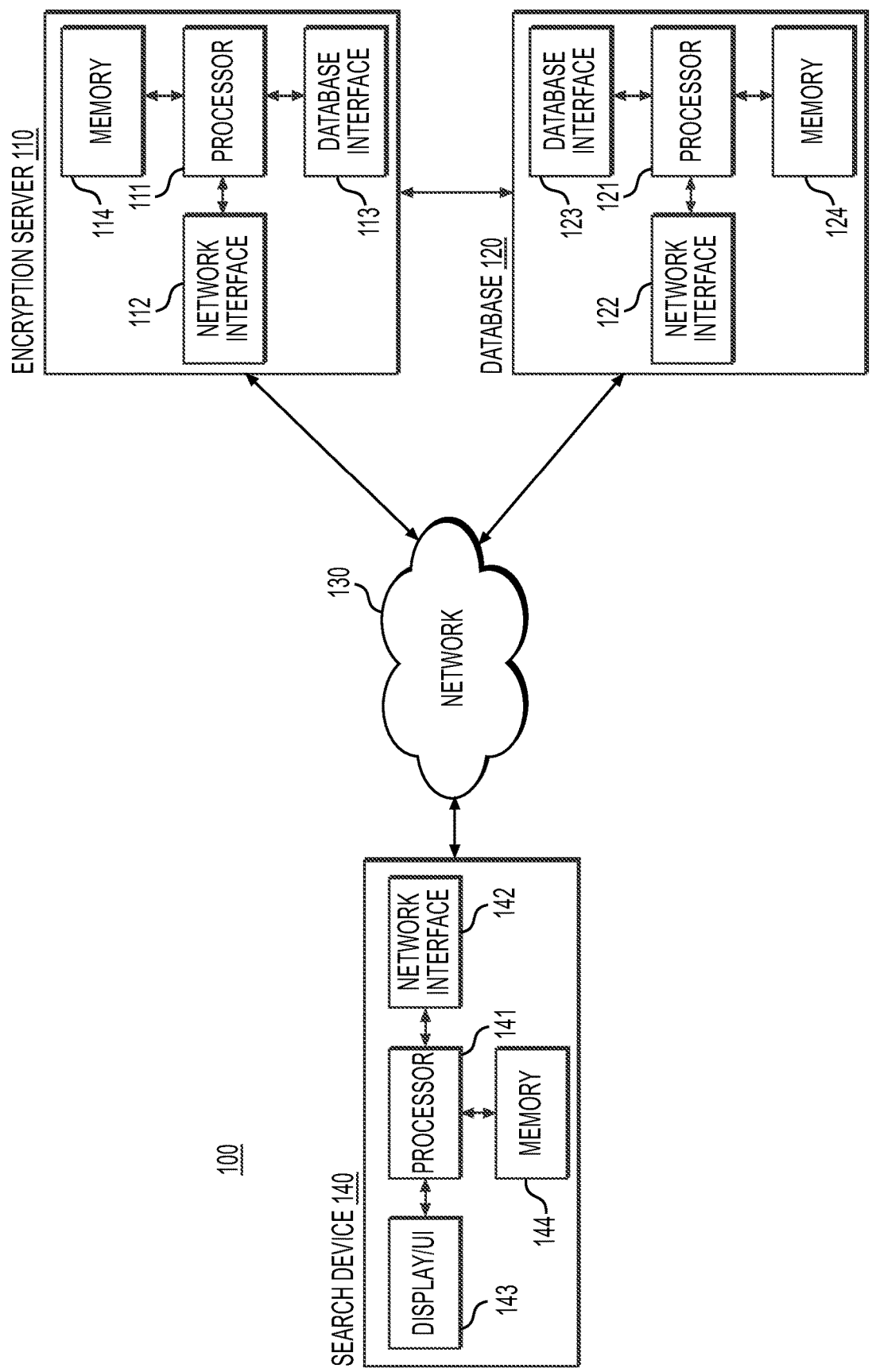
FIG. 1 depicts an exemplary environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for similarity searching encrypted data strings. Institutions may have databases of confidential information, such as social security numbers or credit card numbers, which are secured via encryption. In the event that, for example, it is suspected that a data string may have been entered incorrectly, it may become necessary to search the database for data strings that slightly differ from the one to be searched. Because the data is encrypted for storage, in order to run a similarity search, the entire database may have to be decrypted, searched, and re-encrypted. This process is energy intensive and can create exploitable security issues.

The methods and systems disclosed herein may enable an institution to conduct searches for similar data strings in otherwise encrypted data, which in turn may allow the institution to narrow down the amount of data that may need to be decrypted in order to find the similar record. For example, rather than decrypting an entire database to conduct a search for a record containing a similar Social Security Number, the data may have edit distance(s) calculated with respect to a reference data string, and only the records having similar edit distances (or edit distances equal to or below a threshold edit distance) may be decrypted for further analysis. This may allow the institution to reduce the need for wide-scale decryption, thereby maintaining security protocols at a high level for at least a portion of the data.

FIG. 1 depicts an exemplary system environment 100 that may be utilized with techniques presented herein. For example, the environment 100 may include encryption server 110 which may obtain and encrypt/decrypt data strings, prior to storing them in, for example, a database 120. Encryption server 110 may include a processor 111 to execute instructions, and a network interface 112 with which to communicate with other elements in system environment 100. System server 110 may also include a database interface 113, in addition to or in combination with network interface 112, which may enable encryption server 110 to communicate securely with database 120. Instructions to be executed by processor 111 may be stored in memory 114.

Database 120 may be, for example, a secure server or other system associated with an institution and on which encrypted data may be stored. Database 120 may include a processor 121 to execute instructions stored in a memory 124 in order to allow database 120 to receive and store encrypted data received via a network interface 122 and/or a database interface 123.

Network interface 112 of encryption server 110 and network interface 122 of database 120 may communicate with each other and/or other elements of the system environment 100 via network 130. Network 130 may be implemented as, for example, the Internet, a wireless network, a wired network (e.g., Ethernet), a local area network (LAN), a Wide Area Network (WANs), Bluetooth, Near Field Communication (NFC), or any other type of network or combination of networks that provides communications between one or more components of the system environment 100. In some embodiments, the network 130 may be implemented using a suitable communication protocol or combination of protocols such as a wired or wireless Internet connection in combination with a cellular data network.

Network 130 may provide system server 110 and institutional database 120 with access to sensitive data, such as personally identifying information or financial information, and it may be desired to search this data via, for example, a search device 140. Search device 140 can be, for example, a computer, smartphone, tablet, or other network-accessible computing device, and may include a processor 141, a network interface 142, a display/user interface (UI) 143, and a memory 144. Processor 141 may enable the search device 140 to receive queries of the encrypted data, and provide the parameters of those queries, via network 130 and network interface 142, to encryption server 110 and/or database 120.

While system environment 100, as illustrated in FIG. 1, is depicted as having a single search device 140, this disclosure contemplates that there may be more than one of one or more of the elements depicted without departing from the scope of the disclosure. For example, a number of institutional employees or clients may be permitted to conduct searches of database 120 via personal computers or devices.

Figure 2:
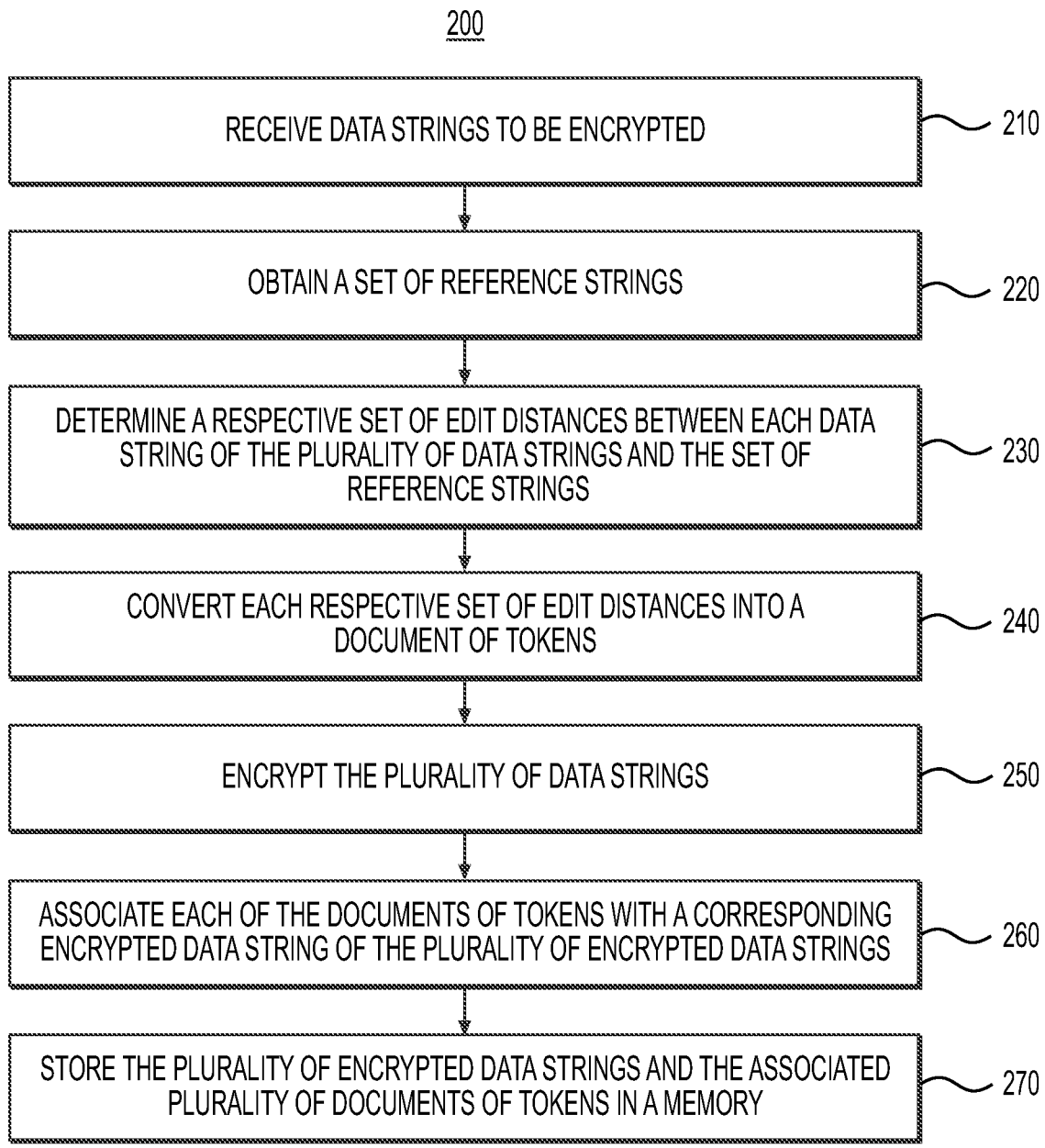
FIG. 2 depicts an exemplary process for encrypting and storing data.

FIG. 2 illustrates a method 200 for receiving and storing encrypted data strings, according to some embodiments of the present disclosure. The method may be performed by a system in accordance with the present disclosure, including one or more of the devices that comprise the system environment 100. For example, in some embodiments in accordance with the present disclosure, method 200 may be carried out by encryption server 110.

Method 200 may begin at step 210 with the receipt of a set of data strings or records to be encrypted and securely stored. The set of data strings may include information, such as, for example, personally identifying information, financial information, and/or medical information. For example, these data strings may take the form of an institutional profile or other record that is associated with a particular person, entity, account, or transaction.

Once received, method 200 may continue at step 220 by obtaining a set of reference strings. The reference strings may be obtained from, for example, memory 114 and/or via network 130. The reference strings may include a series of particular data strings that may be securely generated and fixed to serve as a reference for subsequent steps of one or more disclosed methods.

Having obtained the reference strings, at step 230, encryption server 110 may determine a set of edit distances between each data string to be encrypted and the reference strings. The edit distances may be calculated between each data string received at step 210 and the reference strings obtained at step 220. At step 240, each of the respective sets of edit distances may be tokenized or converted into a document of tokens that includes each of the edit distances calculated between a particular data string and the one or more reference strings.

Figure 3:
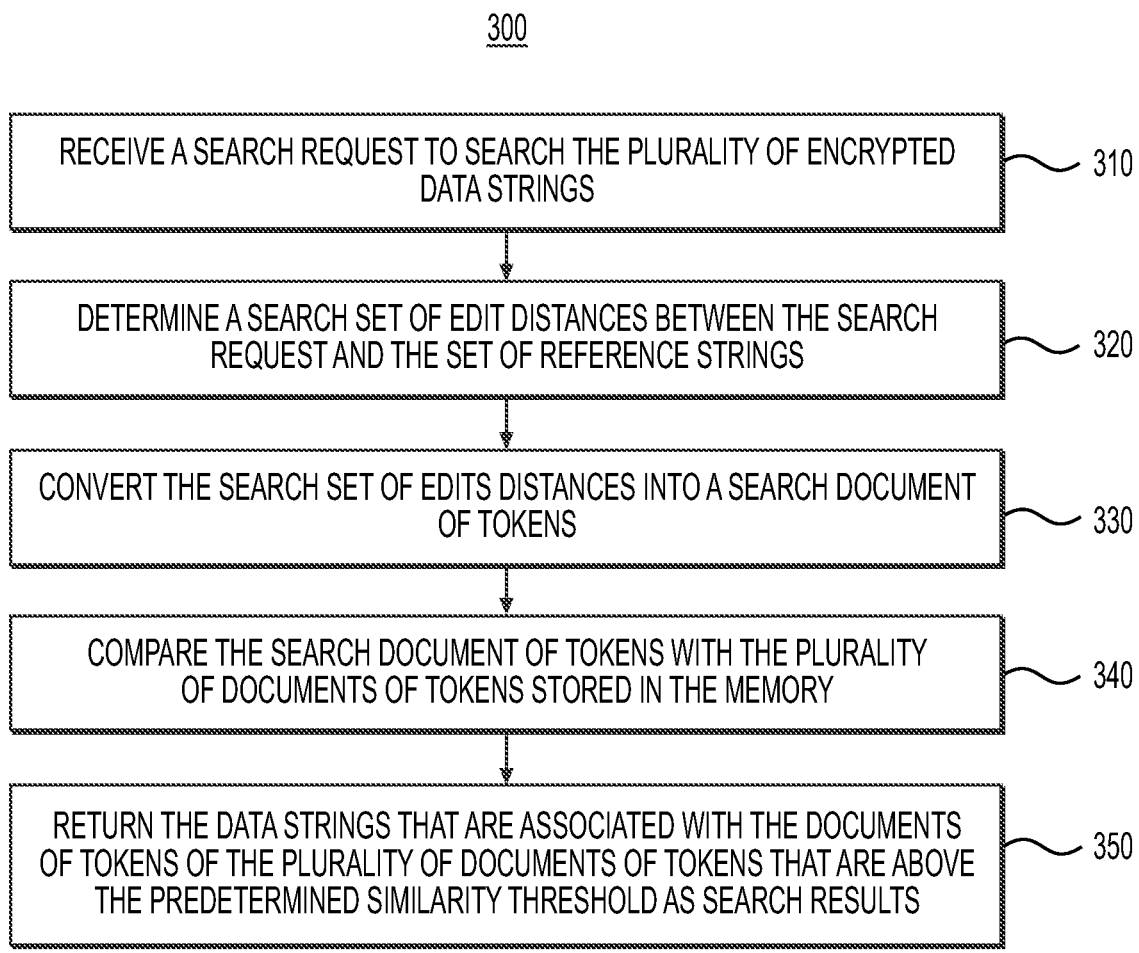
FIG. 3 depicts an exemplary process for similarity searching within encrypted data.

With the documents of tokens created, the initially received data strings may then be encrypted by, for example, encryption server 110 by one or more encryption methods suitable for the level of security needed for the type of data string being stored, at step 250. In applications where the data strings are moderately sensitive, sufficiently strong encryptions may be selected, while applications dealing with more highly sensitive data strings may employ stronger encryption methods. Regardless of the encryption used, at step 260, each of the now-encrypted data strings may be associated with its corresponding document of tokens generated at step 240. Then, at step 270, the encrypted data strings and the associated documents of tokens can be stored in, for example, memory 124 of database 120. The association allows the original data string to remain encrypted, while the corresponding document of tokens serves as a partial index that will enable the similarity searching to be conducted. An exemplary method 300 of this searching is depicted in FIG. 3.

At step 310, encryption server 110 may receive a search request/query to locate data strings (now encrypted) that are similar to a search request data string. The search request may be provided to encryption server 110 by search device 140 via network 130, and the request may contain one or more search parameters including, for example, an identification of the portion of database 120 to be searched, a search request data string, and a predetermined similarity threshold.

Once a search request is received, at step 320, encryption server 110 may determine a set of edit distances between the search request data string and the set of reference strings obtained at step 220 of method 200. This search set of edit distances can then be converted into a document of tokens at step 330. The search document of tokens can then represent what a document of tokens would contain if the search data string was encrypted and stored as in method 200, but instead of storing the search document of tokens, at step 340, the search document of tokens can be compared to the documents of tokens associated with the encrypted data strings stored in database 120.

Figure 4:
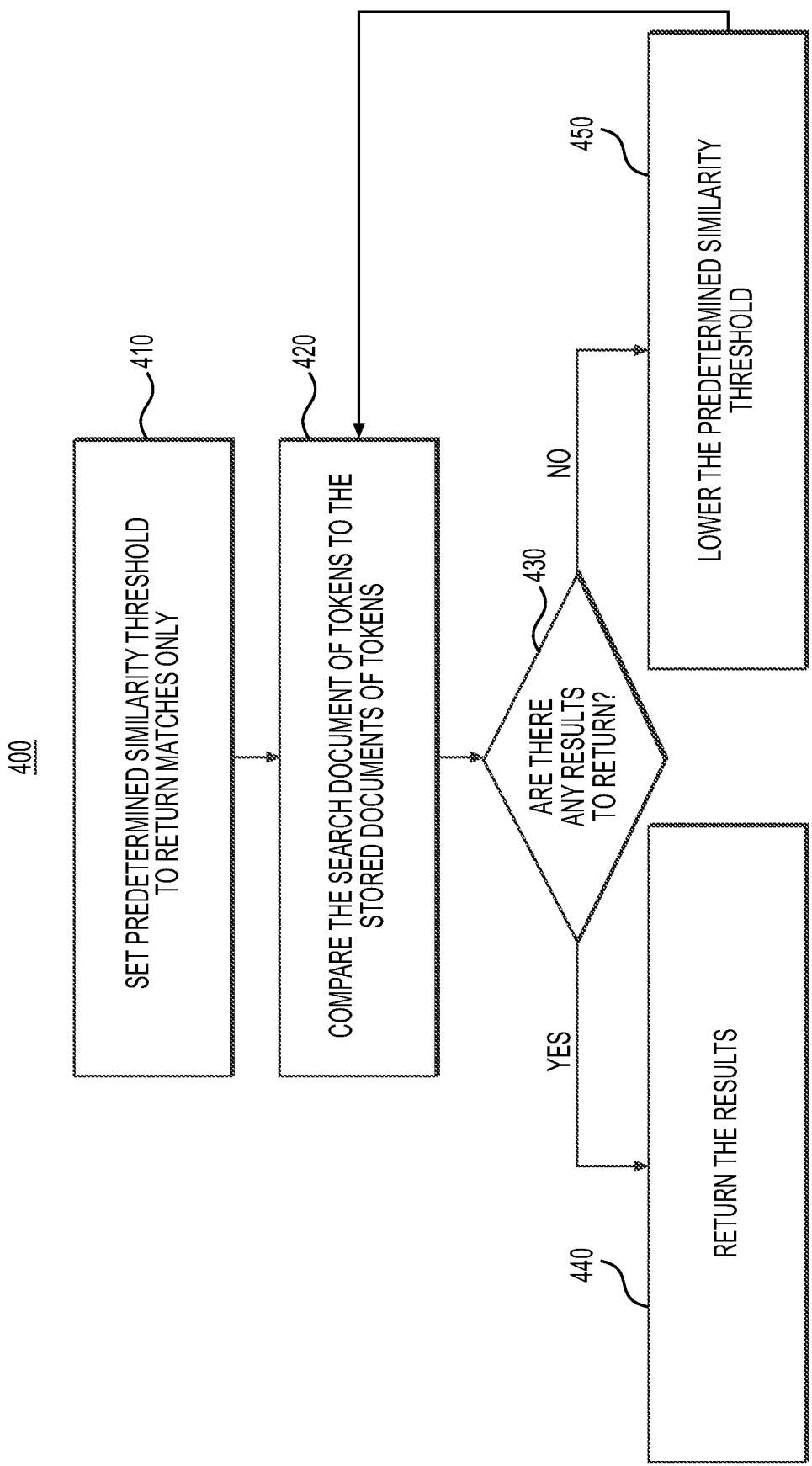
FIG. 4 depicts an exemplary process for returning search results based on a similarity threshold.

Method 400, depicted in FIG. 4, may describe a method of applying a particular similarity threshold to the comparison between the search document of tokens and the documents of tokens stored in database 120. At step 410, the initial search similarity threshold may be set, for example, to return only data strings associated with documents of tokens that are a match to the search document of tokens. The comparison can proceed, at step 420, to be conducted between the search document of tokens and the stored documents of tokens. In the event that the comparison identifies a matching (e.g., a perfectly matching) document of tokens (step 430: Yes), at step 440 those results can be returned. However, in the event that no suitably matching documents of tokens can be located (step 430: No), then encryption server 110 may, at step 450, lower the similarity threshold, and return to step 420 to conduct another comparison. This process may be repeated until the comparison locates a suitably close document of tokens stored in database 120.

Returning to FIG. 3, having identified at least one document of tokens that suitably matches the search document of tokens, at step 350, encryption server 110 may decrypt the data strings that are associated with the at least one identified document of tokens, and return that/those data strings as the search result. In some embodiments, the search result may include additional data or data strings associated with the document of tokens and/or the search result returned may identify the location of additional information without decrypting any of the stored data. Depending on the similarity threshold used to arrive at the search results, the search results may include an indication or estimation of the underlying similarity in lieu of or in addition to the data string itself.

In practice, a method in accordance with the present disclosure may, for example, compute an edit distance for each unencrypted string to be encrypted against a number (N) of reference values that may be randomly selected or generated. In applications in which the length of the data strings to be stored are of a known dimension (e.g., SSNs, phone numbers, bank account numbers), the reference strings can be selected to be of the same string length as the unencrypted string. The N reference strings can then be stored securely and privately in a suitable location, and may in fact be encrypted themselves when not in use. As a result of the limited dimensionality of a relatively short data string, such as a SSN, there is a limited universe of possible sets of edit distances. The encrypted string, having been embedded into an N-dimensional space where each dimension has a limited set of values, may then be stored with an N-dimensional edit distance vector.

At the time of a query, the query string can similarly be embedded into the N-dimensional space, and because similar strings will be embedded near each other in this N-dimensional space, it is then possible to search for N-dimensional edit distance vectors in the encrypted database that are themselves a short distance from the query N-dimensional vector. The "shortness" of the distance searched between the query N-dimensional edit distance vector and those in the encrypted database may be determined by the search similarity parameter such that only suitably similar SSNs are identified.

Due to the limited universe of edit distances, it may be practical to compute the Hamming distance between the N-dimensional vectors, rather than computing a more resource intensive distance calculation such as a Euclidean or TaxiCab distance function. The Hamming distance computation may then be readily converted into a fast query search by transforming the N-dimensional vector into a document of tokens. Each token can take the form of "reference index"+"distance_to_reference_index value", such that the reference index may range from 0 to N−1. According to this example, searching for records with short Hamming distances translates into finding documents with high similarity, identified by their matching or nearly matching tokens. Because enterprise full-text search platforms are generally capable of being configured to perform this type of analysis efficiently, particularly as compared to more complex distance function calculations, similar encrypted strings may be located with a system that may save resources and/or processing time.

Figure 5:
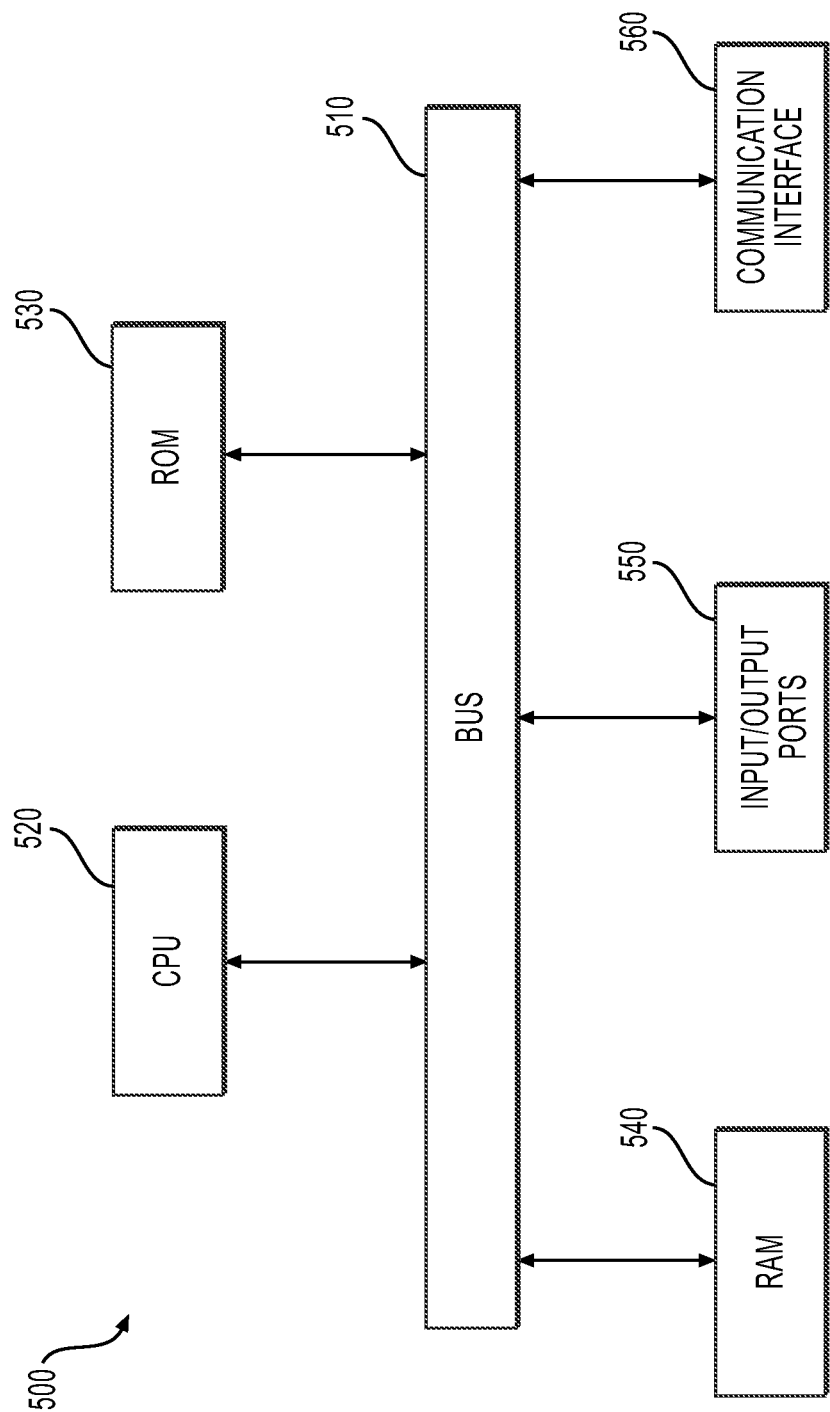
FIG. 5 depicts an example of a computing device, according to aspects of the present disclosure.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit (CPU) 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer. Also, the presently disclosed embodiments may be applicable to any type of Internet protocol. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to, the process shown in FIGS. 2-4, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method of similarity searching encrypted data strings, the method comprising:
   receiving a plurality of data strings to be encrypted;
   obtaining a set of reference strings;
   determining a respective set of edit distances between each data string of the plurality of data strings and the set of reference strings;
   converting each respective set of edit distances into a document of tokens;
   encrypting the plurality of data strings;
   associating each of the documents of tokens with a corresponding encrypted data string of the plurality of encrypted data strings;
   storing the plurality of encrypted data strings and the associated plurality of documents of tokens in a memory;
   receiving a search request to search the plurality of encrypted data strings;
   determining a search set of edit distances between the search request and the set of reference strings;
   converting the search set of edit distances into a search document of tokens;
   comparing the search document of tokens with the plurality of documents of tokens stored in the memory to determine which of the plurality of documents of tokens are above a predetermined similarity threshold when compared to the search document of tokens; and
   returning, as a search result, the data strings that are associated with the documents of tokens of the plurality of documents of tokens that are above the predetermined similarity threshold when compared to the search document of tokens.

2. The method of claim 1, wherein the plurality of data strings to be encrypted comprise personally identifying information.

3. The method of claim 2, wherein the personally identifying information comprises account numbers.

4. The method of claim 1, wherein each reference string of the set of reference strings has dimensions that are the same as dimensions of each data string of the plurality of data strings.

5. The method of claim 1, wherein the search request includes a search data string.

6. The method of claim 1, wherein the predetermined similarity threshold is defined in the search request.

7. The method of claim 1, wherein the predetermined similarity threshold is a match.

8. The method of claim 7, further comprising:
lowering the predetermined similarity threshold in the event that no matches are found between the search document of tokens with the plurality of documents of tokens stored in the memory; and
repeating the comparing of the search document of tokens with the plurality of documents of tokens stored in the memory using the lowered predetermined similarity threshold.

9. The method of claim 1, further comprising:
decrypting, prior to returning the data strings, the encrypted data strings that are associated with the documents of tokens of the plurality of documents of tokens that are above the predetermined similarity threshold when compared to the search document of tokens.

10. The method of claim 9, wherein the search result comprises one or more data strings of the plurality of data strings to be encrypted that have a Hamming distance to the search request that is less than 2.

11. A system for conducting searches within encrypted data strings, the system comprising:
a memory storing instructions; and
a processor executing the instructions to perform a process including:
receiving a plurality of data strings to be encrypted;
obtaining a set of reference strings;
determining a respective set of edit distances between each data string of the plurality of data strings and the set of reference strings;
converting each respective set of edit distances into a document of tokens;
encrypting the plurality of data strings;
associating each of the documents of tokens with a corresponding encrypted data string of the plurality of encrypted data strings;
storing the plurality of encrypted data strings and the associated plurality of documents of tokens in an encrypted database;
receiving a search request to search the plurality of encrypted data strings;
determining a search set of edit distances between the search request and the set of reference strings;
converting the search set of edit distances into a search document of tokens;
comparing the search document of tokens with the plurality of documents of tokens stored in the memory to determine which of the plurality of documents of tokens are above a predetermined similarity threshold when compared to the search document of tokens; and
returning, as a search result, the plurality of data strings that are associated with the documents of tokens of the plurality of documents of tokens that are above the predetermined similarity threshold when compared to the search document of tokens.

12. The system of claim 11, wherein the plurality of data strings to be encrypted comprise personally identifying information.

13. The system of claim 12, wherein the personally identifying information comprises account numbers.

14. The system of claim 11, wherein each reference string of the set of reference strings has dimensions that are the same as dimensions of each data string of the plurality of data strings.

15. The system of claim 11, wherein the search request includes a search data string.

16. The system of claim 11, wherein the predetermined similarity threshold is defined in the search request.

17. The system of claim 11, wherein the predetermined similarity threshold is a match.

18. The system of claim 17, the process further comprising:
lowering the predetermined similarity threshold in the event that no matches are found between the search document of tokens with the plurality of documents of tokens stored in the memory; and
repeating the comparing of the search document of tokens with the plurality of documents of tokens stored in the memory using the lowered predetermined similarity threshold.

19. The system of claim 11, the process further comprising:
decrypting, prior to returning the data strings, the encrypted data strings that are associated with the documents of tokens of the plurality of documents of tokens that are above the predetermined similarity threshold when compared to the search document of tokens.

20. A method of similarity searching encrypted data strings, the method comprising:
receiving a plurality of data strings comprising personally identifying information, and that are to be encrypted for storage;
obtaining a set of reference strings having dimensions that match dimensions of the plurality of data strings;
determining a respective set of edit distances between each data string of the plurality of data strings and the set of reference strings;
converting each respective set of edit distances into a document of tokens;
encrypting the plurality of data strings;
associating each of the documents of tokens with a corresponding encrypted data string of the plurality of encrypted data strings;
storing the plurality of encrypted data strings and the associated plurality of documents of tokens in an encrypted database;
receiving a search request to search the plurality of encrypted data strings, the search request comprising a search data string and a similarity threshold;
determining a search set of edit distances between the search request data string and the set of reference strings;
converting the search set of edit distances into a search document of tokens;
comparing the search document of tokens with the plurality of documents of tokens stored in the encrypted database to determine which of the plurality of documents of tokens are above the similarity threshold when compared to the search document of tokens;
decrypting the encrypted data strings that are associated with the documents of tokens of the plurality of documents of tokens that are above the similarity threshold when compared to the search document of tokens; and
returning, as a search result, the decrypted data strings that are associated with the documents of tokens of the plurality of documents of tokens that are above the similarity threshold when compared to the search document of tokens.

* * * * *